Patented Dec. 6, 1938

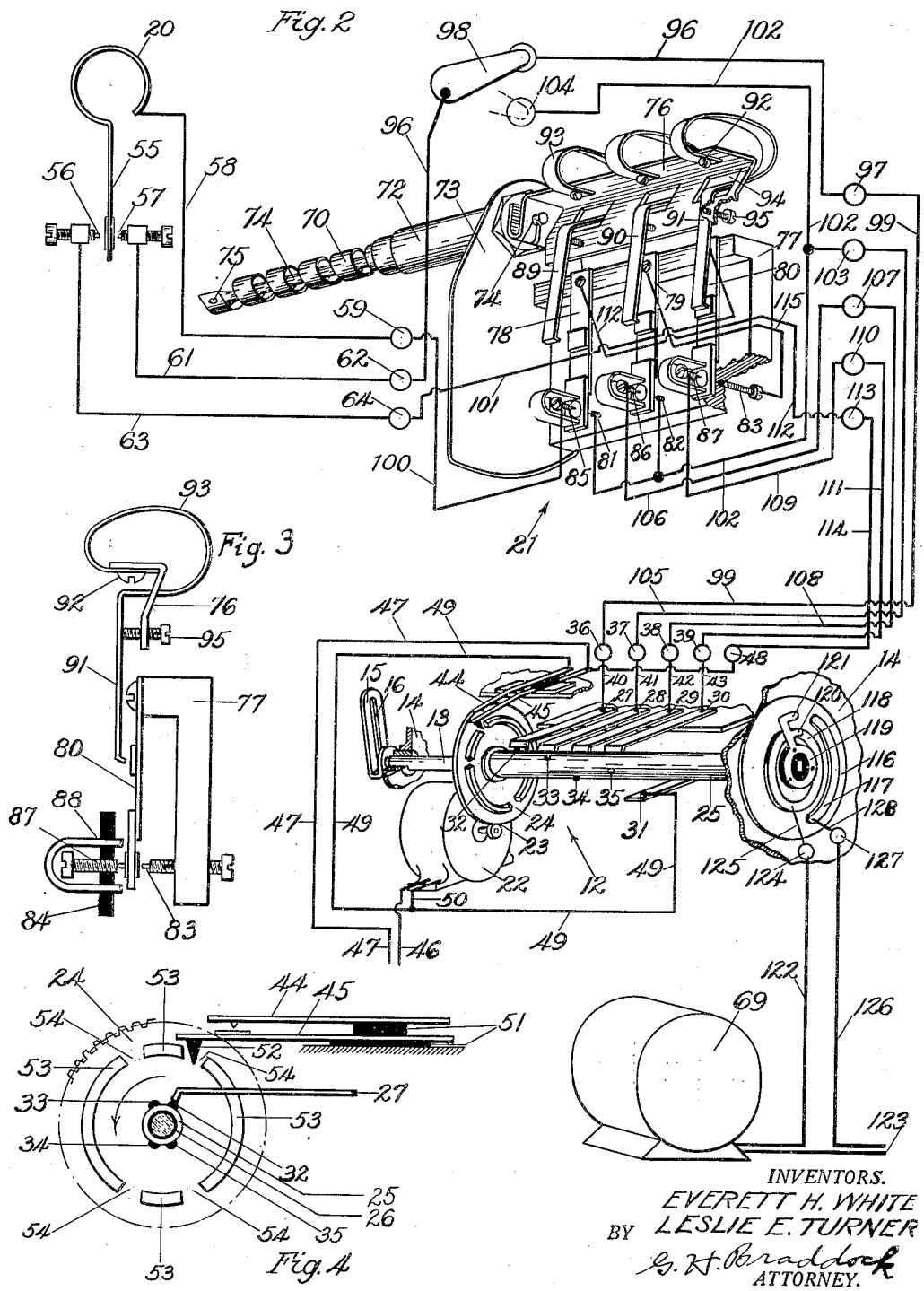

2,139,052

UNITED STATES PATENT OFFICE 2,139,052

REMOTE CONTROL MECHANISM

Everett H. White and Leslie E. Turner, St. Paul, Minn.; said Turner assignor to said White Application May 11, 1936, Serial No. 79,045

7 Claims. (Cl. 236—9)

This invention relates to electrically operated mechanisms for the remote control of heat producing devices or furnaces which include heat regulating means, such, for example, as heating plant dampers, steam, water, oil and gas valves, intake and mixing valves, automatic stokers, etc., requiring motive power to effect their operation, and which additionally include means for forcibly circulating air warmed by said heat producing devices or furnaces into an enclosure or space to be heated.

An object of the invention is to provide an electrically operated mechanism for the remote control of a heat producing device or furnace having heat regulating means and means for producing forced circulation of air warmed by said device or furnace, wherein said heat regulating means of said device or furnace and said means for producing forced circulation of the warmed air will be controlled, in the novel and improved manner to be hereinafter fully set forth, by and with respect to the temperature at said heat producing device or furnace, as well as by and with respect to the temperature at an enclosure or space to be heated by said device or furnace.

A further object is to provide an electrically operated mechanism for the remote control of a heat producing device or furnace having heat regulating means and means for producing forced circulation of air warmed by said device or furnace, which will include a regulator motor associated in novel and improved manner with said heat regulating means and said means for producing forced circulation of the warmed air; and will also include a thermostat at an enclosure or space to be heated and a new and improved multiple switch construction responsive to temperature changes at said heat producing device or furnace associated in novel and improved manner with said thermostat and said regulator motor.

And a further object is to provide an electrically operated mechanism of the present character, wherein will be incorporated various improved features and characteristics of construction novel both as individual entities of said mechanism and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is a diagrammatic view disclosing the thermostat at an enclosure or space to be heated, the multiple switch construction responsive to temperature changes at the heat producing device or furnace, the regulator motor, and the wiring system of the electrically operated remote control mechanism;

Fig. 3 is a detail view of the multiple switch construction; and

Fig. 4 is a detail view of the regulator motor.

Figure 1:
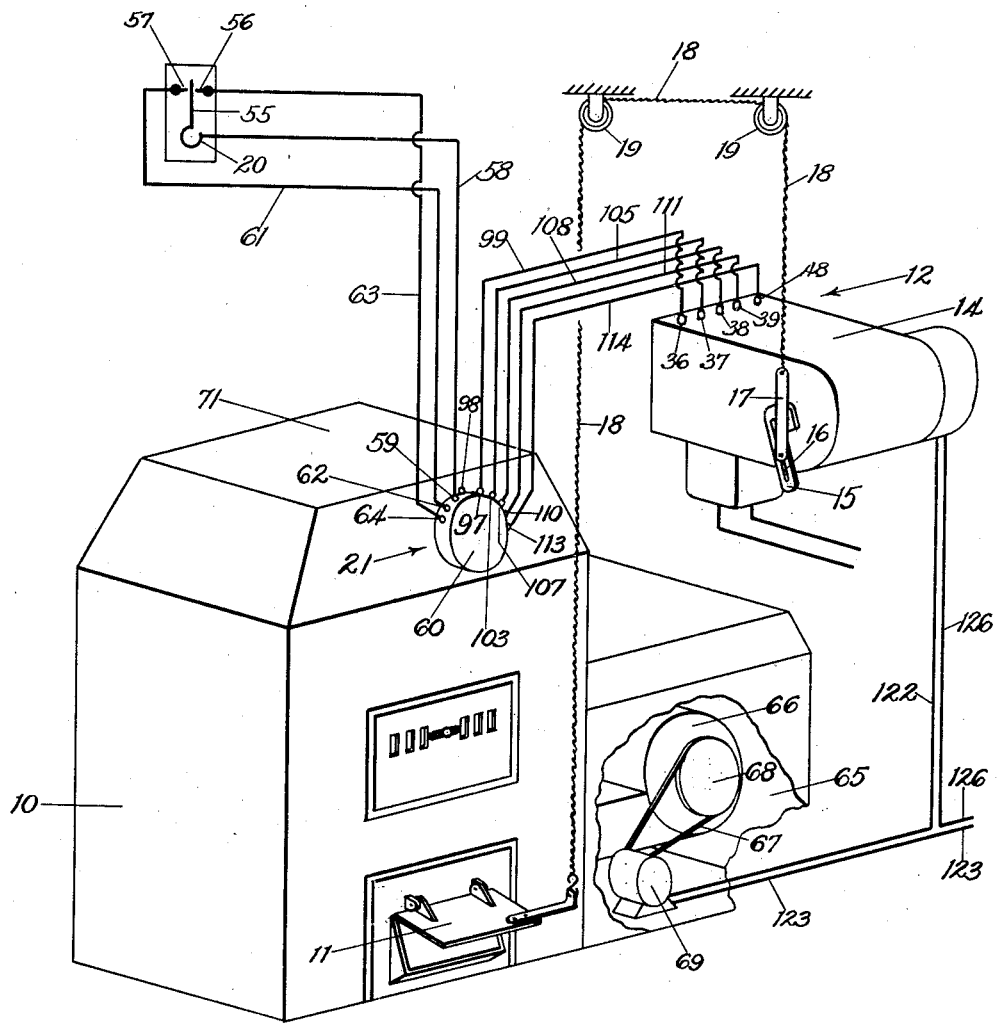
Fig. 1 is a diagrammatic view of an electrically operated control mechanism made according to the principles of the invention as when applied to control the draft and the air blower of a heat producing device or furnace which is also shown.

With respect to the drawings and the numerals of reference thereon, 10 represents a heating furnace including a draft damper 11. A regulator motor, indicated generally at 12, is shown applied to the furnace to regulate the draft damper 11, although, as will become obvious, said regulator motor 12 can be applied to control any other devices requiring motive power to effect their operation, as, for example, valves controlling a flow of steam, water, gas or other fluid; intake and mixing valves; automatic stokers, etc.

The regulator motor 12 includes a driven or actuating shaft 13, which is suitably mounted in a casing 14 for said regulator motor, carrying a crank arm 15 at one of its ends and disposed outside of the casing 14. The crank arm 15 is longitudinally slotted, as at 16, and a link 17 is rotatably mounted in the slot 16 to be adjustable away from and toward the driven or actuating shaft 13. The link 17 is attached to a manipulating member, cord or chain 18 suitably attached to an outer portion of the draft damper 11 and ridable over pulleys 19. When the crank arm 15 is positioned as in Fig. 1, the draft damper 11 is open and the check damper (not shown) is closed. When said crank arm 15 is at 150°, more or less, from its position as in Fig. 1, said draft damper is closed by gravity and the check damper is open.

It is the function of an ordinary thermostat 20, in remote relation to the furnace 11, as, for instance, in a room to be heated, and a multiple switch construction, designated generally at 21, directly subjected to the temperature of said furnace, to control electrical circuits including the regulator motor to cause said regulator motor to be operated to situate the driven or actuating shaft 13 in one of several different positions of the crank arm 15, and to as a consequence situate the drift damper 11 in open or in closed position.

As shown very clearly in Figs. 1 and 2, the casing 14 suitably supports an electric motor 22 which is drivingly connected, as at 23, to a gear 24 fixed upon the driven or actuating shaft 13. Said driven or actuating shaft 13 carries a circuit breaker drum 25 which is suitably insulated from the driven or actuating shaft as indicated at 26. A circuit breaker includes a number of conducting clips 27, 28, 29, 30 and 31 which make electrical contact with the circuit breaker drum 25. The conducting clips 27, 28, 29 and 30 are raised and lowered, as the drum rotates, by small insulating buttons, designated 32, 33, 34 and 35, mounted on the drum, there being one insulating button for each conducting clip.

Each of the conducting clips 27, 28, 29 and 30 is provided with a terminal, designated 36, 37, 38 and 39, respectively, said terminals being connected to said conducting clips by lead wires, indicated 40, 41, 42 and 43, respectively.

A motor switch consists essentially of two blades, denoted 44 and 45, respectively. Incoming wires from a source (not shown) of electrical energy are represented 46 and 47. The incoming wire 46 leads directly to the motor 22. The incoming wire 47 leads to a terminal 48 and is connected to the blade 45. A lead wire 49 connects the conducting clip 31 to the blade 44, and a lead wire 50 connects said lead wire 49 to the motor 22. The gear 24 operates the blade 45. The blades 44 and 45 are insulatively attached, as at 51, upon a support in the casing 14. See Fig. 4. Said blade 45 is resilient and includes an insulating protuberance 52 adapted to ride upon arc members 53 of the gear 24 when the electric motor 22 is in operation to cause the blades 44 and 45 to be in engagement, and to lie in slots 54 between said arc members when said electric motor is at rest.

As soon as the gear 24 starts to operate, an arc member 53 engages beneath the insulating protuberance 52 to make contact between blades 44 and 45. The circuit for the motor 22 is from the lead in wire 47 to the blade 45, thence through the blade 44 and the lead wires 49 and 50, and to the lead in wire 46. The function of the motor switch 44, 45 is to provide a holding circuit through the motor 22, so that said motor, once started, will operate whenever the insulating protuberance 52 is not in one of the slots 54.

The regulator motor 12 operates in the manner as follows. As shown in Fig. 2, said regulator motor 12 is in an inoperative position indicated by the conducting clip 27 which is separated from the circuit breaker drum by the insulating button 32, as disclosed very clearly in Fig. 4. When connection is now made from the terminal 48 to any one of the terminals 37, 38 or 39 when in electrical engagement with the circuit breaker drum 25, the circuit to the electric motor 22 is closed and the gear 24 and the driven or actuating shaft 13 with circuit breaker drum 25 are set in motion. The circuit through said electric motor 22 is from the lead-in wire 47 to the terminal 48, by the particular connection made, to terminal 37, 38 or 39, by way of the corresponding lead wire and conducting clip 28, 29 or 30, as the case may be, thence through the circuit breaker drum 25 to the conductor clip 31, thence by the lead wires 49 and 50 to the electric motor 22, and thence to the lead in wire 46. This is to say, the terminal 48 may become connected with any one of the terminals 37, 38 or 39, for example, when the regulator motor is situated as in Fig. 2, the conducting clip 27 being spaced from the circuit breaker drum 25 by the insulating button 32. The regulator motor will operate until the corresponding clip 28, 29 or 30 is raised by its insulating button on the circuit breaker drum 25 to break electrical connection from said terminal 48 through the selected terminal 37, 38 or 39 to said circuit breaker drum. The driven or actuating shaft 13 will remain in the position at which thus set by the electric motor 22 until connection is again made from the terminal 48 to one of the terminals 36, 37, 38 or 39 in electrical contact with the circuit breaker drum.

The room thermostat 20, which is a bimetallic blade, includes an arm 55 adapted to travel between spaced apart terminals 56 and 57. The thermostat 20 is connected by a lead wire 58 to a terminal 59 insulatively mounted upon a casing 60 housing the multiple switch mechanism 21 and suitably mounted on the furnace 10. The terminal 57 is connected by a lead wire 61 to a terminal 62 upon the casing 60, and the terminal 56 is connected by a lead wire 63 to a terminal 64 upon said casing 60.

The heating furnace 10 includes the usual heating chamber surrounding the fire box and having warmed air outlet pipes (not shown) leading to the enclosure or space to be heated. Means for producing forced circulation of the warmed air upwardly through said heating chamber and said outlet pipes to the enclosure or space to be heated consists of a compartment 65 housing a suitable mounted air blower or fan 66 driven by a belt 67 upon a pulley 68 fixed to the blower or fan shaft and upon a pulley fixed to the shaft of an electric motor 69 for driving the blower or fan. The electric motor 69 may be supported in any convenient manner.

The multiple switch mechanism 21 is manipulated by an ordinary bonnet thermostat 70 mounted in the bonnet 71 of the heating furnace 10. Said bonnet 71 includes an opening which receives a hollow shaft 72. The outer end of the bonnet thermostat 70 is attached to the inner end of the hollow shaft 72, and the outer end of said hollow shaft integrally carries the casing 60 and a base plate 73 within said casing. The arrangement is such that the bonnet thermostat is within the bonnet of the furnace and the casing 60 is adjacent to the outer wall of the bonnet, outside the heating furnace.

An operating rod 74 has its inner end attached, as at 75 to the inner end of said bonnet thermostat. The rod 74 extends freely through the bonnet thermostat and through the hollow shaft 72 horizontally out of the bonnet of the furnace and into the casing 60. An outer portion of said rod 74 is oscillatably mounted in the base plate 73. The outer end of the rod 74 fixedly carries a switch operating device 76 situated within the casing 60.

An insulating support 77, suitably and conveniently secured to the base plate 73 and housed by the casing 60, carries spaced apart, resilient contact elements, represented 78, 79 and 80, respectively. Said insulating support 77 also carries spaced apart terminals, designated 81, 82 and 83, respectively. The terminal 81 is adjacent to the contact element 78, the terminal 82 is adjacent to the contact element 79, and the terminal 83 is adjacent to the contact element 80.

A second insulating support 84 upon said base plate 73 carries spaced apart terminals, indicated at 85, 86 and 87, respectively. The terminal 85 is adjacent to the contact element 78 at the side thereof opposite the terminal 81, the terminal 86 is adjacent to the contact element 79 at the side thereof opposite the terminal 82, and the terminal 87 is adjacent to the contact element 80 at the side thereof opposite the terminal 83. The insulating support 84 may include magnets 88 for all of the terminals 81, 82, 83, 85, 86 and 87.

The resilient contact elements 78, 79 and 80 are normally, when the furnace is unheated, in engagement with the terminals 85, 86 and 87, respectively. The switch operating device 76 fixed upon the operating rod 74 carries shaped, resilient fingers, denoted 89, 90 and 91, respectively, for moving the contact elements 78, 79 and 80 out of engagement with the terminals 85, 86 and 87 and into engagement with the terminals 81, 82 and 83 in response to heating up of the furnace. Each of the resilient fingers 89, 90 and 91 has one of its ends secured, as at 92, to the device 76 and includes a looped portion 93 extending through a slot 94 in said device. An adjusting screw 95 for each resilient finger is arranged in said device 76 in engagement with the working portion of the corresponding finger. Adjustment of the screws against the natural resilience of the fingers sets the working portions of said fingers with relation to the contact elements 78, 79 and 80, closer to or further from said contact elements, as may be the intention. As disclosed, the resilient finger 91 is set closest to its corresponding contact element 80 and will cause this contact element to be removed from the terminal 87 and into engagement with the terminal 83, in response to rise of temperature at the furnace, while the contact elements 79 and 78 still engage the terminals 86 and 85, respectively. The resilient finger 90 is set further away from its corresponding contact element 79 than is the finger 91 from its corresponding contact element 80, but the finger 90 and contact element 79 are set closer together than are the finger 89 and the contact element 78, so that said resilient finger 90 will cause the contact element 79 to be removed from the terminal 86 and engage the terminal 82, in response to rise of temperature at the furnace, after the contact element 80 has engaged the terminal 83 and while the contact element 78 is still in engagement with the terminal 85. Stated differently, when the furnace 10 heats up, the resilient finger 91 will first cause the contact element 80 to become disengaged from the terminal 87 and engage the terminal 83. As the temperature rises higher, the resilient finger 90 will cause the contact element 79 to become disengaged from the terminal 86 and engage the terminal 82. And as the temperature rises still higher, the resilient finger 89 will cause the contact element 78 to become disengaged from the terminal 85 and engage the terminal 81. When the temperature at the furnace falls, the contact elements will be permitted to return to the terminals 85, 86 and 87, the contact element 78 first becoming removed from the terminal 81 and engaging the terminal 85, the contact element 79 next becoming removed from the terminal 82 and engaging the terminal 86, and the contact element 80 finally becoming removed from the terminal 83 and engaging the terminal 87. Said contact elements 78, 79 and 80 upon becoming removed from their corresponding terminals 81, 82 and 83, respectively, engage their corresponding terminals 85, 86 and 87, respectively, with a snap action, and vice versa. The resilient fingers 89, 90 and 91 and the loops 93 thereof become flexed upon oscillatory movement of the device 76 tending to move said resilient fingers toward the right in Figs. 2 and 3 after engagement of the contact elements 78, 79 and 80 with the terminals 81, 82 and 83. Upon flexing of each resilient finger 89, 90 or 91 the corresponding adjusting screw 95 moves away from the finger, toward the right in said Figs. 2 and 3, as will be understood.

A lead wire 96 connects the terminal 62 to a terminal 97 upon the casing 60, and said lead wire 96 includes a so-called summer-winter switch 98 upon said casing. A lead wire 99 connects said terminal 97 to the terminal 36. A lead wire 100 connects the terminal 59 to the terminal 85, and a lead wire 101 connects the terminal 64 to the contact element 80. A lead wire 102 connects the terminals 81 and 82 to each other and to a terminal 103 upon the casing 60, and an extension of said lead wire 102 includes a terminal 104 for the summer-winter switch 98, said terminal 104 also being upon said casing. A lead wire 105 connects the terminal 103 to the terminal 37. A lead wire 106 connects the terminal 86 to a terminal 107 upon the casing 60, and a lead wire 108 connects the terminal 107 to the terminal 38. A lead wire 109 connects the terminal 87 to a terminal 110 upon the casing 60, and a lead wire 111 connects said terminal 110 to the terminal 39. A lead wire 112 connects the contact element 78 to a terminal 113 upon the casing 60, and a lead wire 114 connects said terminal 113 to the terminal 48. A lead wire 115 connects the contact element 79 to the terminal 83.

An insulating member 116, which is suitably supported upon the regulator motor casing 14 in any convenient manner, fixedly supports an arcuate conducting segment 117 which extends, as disclosed, through an arc of less than 180°, and said insulating member 116 also fixedly supports an annular conducting segment 118 which is arranged within the confines of the arc of the conducting segment 117 in concentric relation to said arc and in spaced relation to said arcuate conducting segment 117.

The driven or actuating shaft 13 passes outwardly from the regulator motor casing through the insulating member 116 and through the annular conducting segment 118 axially thereof. Said driven or actuating shaft 13 fixedly and insulatively supports a conducting element 119 including spaced apart contactors 120 and 121. The contactor 120 as adapted to wipe over the annular conducting segment 118, and the contactor 121 is adapted to wipe over the arcuate conducting member 117.

Incoming wires from a source (not shown) of electrical energy are denoted 123 and 126. The lead-in wire 126 is connected to a terminal 127, and a lead wire 128 connects said terminal 127 to the arcuate conducting segment 117. The lead in wire 123 is connected to the electric motor 69. A lead wire 122 extends between said electric motor 69 and a terminal 124, and lead wire 125 connects said terminal 124 to the annular conducting segment 118.

During the operation in use of a heat producing device or furnace including heat regulating means, as, for example, the damper 11 herein disclosed, or of some other nature, such as steam, water, oil or gas valves, intake and mixing valves, automatic stokers, etc., and also including means, the blower or fan 66 as herein disclosed, for forcibly circulating air warmed by said heat producing device or furnace into an enclosure or space to be heated, it is highly desirable that said heat producing device or furnace function in entirely automatic manner to ideally care for each and all of several different heating problems which are presented. That is to say, when said enclosure or space is at the desired and predetermined temperature, the heat regulating means should be operative to supply a minimum amount of heat and the warmed air circulating means should, with one exception to be noted later, be idle. When the air in said enclosure or space then falls below the desired and predetermined temperature, said heat regulating means should, ordinarily, be operative to supply an increased amount of heat. The warmed air forcing means should be operative while said enclosure or space is calling for heat, whenever there is air at the heat producing device or furnace at sufficient and predetermined temperature to be effective in raising the temperature of said enclosure or space when forced thereinto by said warmed air forcing means, but said warmed air forcing means should be idle when said air at the heat producing device or furnace is below said sufficient and predetermined temperature, it evidently being undesirable to blow unheated air into an enclosure or space which is calling for heat. When said enclosure or space commences a call for heat at a time when there is air at the furnace of a certain higher temperature which should be sufficient to raise the temperature of said enclosure or space, the warmed air forcing means should become operative to force said warmed air into the enclosure or space while the heat regulating means is operative to supply a minimum amount of heat at the heat producing device or furnace, until the enclosure or space reaches the desired and predetermined temperature, or until the temperature of the air at the furnace to be forced into said enclosure or space by the warmed air forcing means falls below said sufficient and predetermined temperature. In the case where the enclosure or space calls for heat and reaches the desired temperature, the heat regulating means for the heat producing device or furnace should be operative to supply a minimum amount of heat and the warmed air forcing means should be idle. In the case where the enclosure or space calls for heat while the air at the furnace is at or above said certain higher temperature and the temperature of the air which is being forced from the furnace then falls below said certain higher temperature, the warmed air forcing means should remain operative and the heat regulating means should become operative to supply an increased amount of heat. Should it happen that the warmed air forcing means at any time removes sufficient warmed air from the furnace to cause the air at the furnace to fall below said sufficient and predetermined temperature, said warmed air forcing means should become idle and the heat regulating means should become, or remain, operative to supply an increased amount of heat at the heating device or furnace. When the temperature of the air at the heat producing device or furnace rises from said mentioned sufficient and predetermined temperature to said mentioned certain higher temperature to cause the heat regulating means to remain, or become, operative to supply a minimum amount of heat and the warmed air forcing means to remain, or become, operative to force warmed air into the enclosure or space, while said enclosure or space is calling for heat, upon the falling of the temperature of the air at the heat producing device or furnace to a temperature below said certain higher temperature, said heat regulating means should become operative to supply a maximum amount of heat and said warmed air forcing means should remain operative to force warmed air into the enclosure or space. If when the enclosure or space reaches the predetermined temperature while the heat producing device or furnace is operative to supply a minimum amount of heat and the warmed air forcing means is inoperative, the temperature of the air at the heat producing device or furnace reaches a temperature still higher than said certain higher temperature, which may be an excessively high temperature, said regulating means should remain operative to supply a minimum amount of heat and said warmed air forcing means should become operative to force warmed air into the enclosure or space. Thereafter, when the temperature of the air at the heat producing device or furnace falls below the before mentioned excessively high temperature, the heat regulating means should remain operative to supply a minimum amount of heat and the warmed air forcing means should become inoperative. Or, stated differently, in an instance where the heating device or furnace contains air at or above the before mentioned excessively high temperature, the highly heated air should not remain in the device or furnace, but should be forced into the enclosure or space even after said enclosure or space has reached the desired temperature, and until the air at the heating device or furnace falls in temperature. It is desirable to remove the highly heated air from the heating device or furnace, while operative to supply a minimum amount of heat, to thus cause said device or furnace to have tendency to become cooled. A heat regulating device or furnace set up to operate under each of the conditions as set forth in the manner in which it is stated said device or furnace should operate, will, obviously, function ideally considered both from the standpoint of fuel economy and the standpoint of satisfactory and efficient heating results. A heat producing device or furnace set up to operate according to the invention will attain the maximum in fuel economy, prevent overruns which ordinarily occur after the heated enclosure or space has reached the predetermined and intended temperature, and attain the maximum in temperature balance at said enclosure or space.

In Fig. 2 of the drawings, the driven or actuating shaft 13 of the regulator motor is positioned with the crank arm 15 extending upwardly and the conducting element 119 also extending upwardly, the contactor 121 being spaced from the arcuate conducting segment 117. Evidently the draft damper 11 would be completely closed, and the electric motor 69 for the blower or fan 66 inoperative. In said Fig. 2, the conductor clip 27 is shown resting upon the insulating button 32, the arm 55 of the room thermostat is out of engagement with the terminals 56 and 57, and the contact elements 78, 79 and 80 of the multiple switch construction 21 are in engagement with the terminals 85, 86 and 87, respectively. Since the conductor clip 27 is resting upon insulating button 32 and since the arm 55 of the room thermostat is out of engagement with the terminal 56, which said arm engages when the enclosure or space calls for heat, said enclosure or space is at the desired temperature.

Supposing that the temperature at the furnace now causes the contact elements 80 and 79 to engage with the terminals 83 and 82, respectively, nothing can happen as a result, as long as the arm 55 of the room thermostat 20 does not engage the terminal 56. Also, supposing that the temperature at the enclosure or space being heated rises to bring the arm 55 into engagement with the terminal 57, nothing can happen as a result. Connection between the arm 55 and the terminal 57 connects the terminal 48 with the terminal 36, but the conductor clip 27 is free from engagement with the circuit breaker drum 25, this conductor clip resting upon the insulating button 32, as has been stated.

Supposing that with the terminal 87 and the contact element 80 in engagement the temperature at the enclosure or space being heated now falls to bring the arm 55 of the room thermostat 20 into engagement with the terminal 56, connection is made between the terminal 48 and the terminal 39. To cause the regulator motor to assume its position as in Fig. 2, the arm 55 had to engage the terminal 57, and after said arm 55 and terminal 57 engage each other, the regulator motor remains in the position of said Fig. 2, until the arm 55 later engages the terminal 56. Connection when made between the terminals 48 and 39, by engagement of the arm 55 with the terminal 56, closes the circuit to the motor 22 because the conductor clip 30 is in engagement with the circuit breaker drum 25 and clear of all of the insulating buttons. The regulator motor is thus caused to advance and to stop when the conductor clip 30 rides upon the insulating button 35 so that there is no electrical connection from the terminal 48 through any of the terminals 36, 37, 38 or 39 to the circuit breaker drum 25. The driven or actuating shaft 13 will remain in the position at which thus set by the electric motor 22 until connection is again made from said terminal 48 through one of the terminals 36, 37, 38 or 39 other than the one having the insulating button upon which the conductor clip 26, 27, 28 or 29 rests when said motor 22 becomes stationary. When the new connection is made, the motor 22 will again operate and stop as before when a conductor clip 27, 28, 29 or 30 rides upon its insulating button while there is no electrical connection from the terminal 48 through any of said terminals 36, 37, 38 or 39 to the circuit breaker drum 25.

The circuit breaker drum 25 is driven to rotate in the direction of the arrow in Fig. 4. As disclosed, the insulating button 33 which is beneath the conductor clip 28 is disposed upon the circuit breaker drum at location about 30° from the insulating button 32. The insulating button 35 which is beneath the conductor clip 30 is disposed at location diametrically opposite the insulating button 33 and about 150° from the insulating button 32. The insulating button 34 which is beneath the conductor clip 29 is disposed at location diametrically opposite the insulating button 32, about 150° from the insulating button 33 and about 30° from the insulating button 35.

When the temperature of the enclosure or space to be heated falls to cause the arm 55 of the room thermostat 20 to engage the terminal 56, to thus set the electric motor 22 in motion, and assuming that the parts of the remote control motor are positioned as in Fig. 2, the regulator motor will come to stationary position when the conductor clip 30 rides upon its insulating button 35, because in said Fig. 2 the furnace is not sufficiently warm to cause the contact element 80 to become disengaged from the terminal 87 and engage the terminal 83. When said arm 55 engaged the terminal 56, a circuit through the electric motor 22 was made from the lead-in wire 47 to the terminal 48, thence through the lead wire 144, the terminal 113 and the lead wire 112 to the contact element 78, thence by the terminal 85 and the lead wire 100 to the terminal 59, thence by the lead wire 58 to the room thermostat 20, thence by the arm 55, the terminal 56 and the lead wire 63 to the terminal 64, thence by the lead wire 101, the contact element 80 and the terminal 87 to the lead wire 109, thence by the terminal 110 and the lead wire 111 to the terminal 39, thence by the lead wire 43 and the conductor clip 30 to the circuit breaker drum 25, thence by the conductor clip 31 and the lead wires 49 and 50 to the motor 22, and from said motor to the lead in wire 46. When the insulating button 35 reaches the location of the conductor clip 30, the circuit through the electric motor 22 as just described will obviously be broken, and there will be no circuit connecting the terminal 48 to said circuit breaker drum 25. When the insulating button 35 is engaged by the conductor clip 30, the draft damper 11 is held approximately wide open, and the conducting element 119 extends vertically downwardly, out of engagement with the conducting segment 117.

The regulator motor upon being brought to stationary position with the insulating button 35 engaging its conductor clip 30 remains stationary until the arm 55 of the room thermostat engages the terminal 57, or until the contact element 80 of the furnace multiple switch construction 21 becomes removed from the terminal 87 and engages the terminal 83. Should the arm 55 engage the terminal 57 before the contact element 80 engages the terminal 83, the driven or actuating shaft 13 would eventually rotate back to its position as in Fig. 2.

Upon the opening of the draft damper 11, the temperature of the heat producing device or furnace 10 will, naturally, rise and cause the contact element 80 to become removed from the terminal 87 and engage the terminal 83. This will make a connection between the terminal 48 and the terminal 38. The conductor clip 29 being in engagement with the circuit breaker drum 25, the regulator motor will advance, this time to position the insulating button 34 under the conductor clip 29. Said regulator motor will come to rest, provided the arm 55 and the terminal 57 are not engaged. The contact element 80 and the terminal 87 will be out of engagement, said contact element 80 having engaged the terminal 83. When the circuit breaker drum 25 is positioned to cause the insulating button 34 to separate its conductor clip 29 from said circuit breaker drum, the conducting element 119 is situated with its contactors 120 and 121 connected across the conducting segments 117 and 118, the contactor 121 being located at the lower portion of the arcuate conducting segment 117, as will be evident, to put the blower or fan motor 69 in closed circuit. Thus the blower or fan 66 is driven to forcibly circulate air into the enclosure or space, and in time the arm 55 may be caused to be brought into engagement with the terminal 57. Upon engagement of said arm 55 and terminal 57, a connection being thus made between the terminal 48 and the circuit breaker drum 25 by reason of the fact that the conductor clip 27 is in engagement with said circuit breaker drum, the regulator motor advances until the insulating button 32 separates said conductor clip 27 from the circuit breaker drum. When this occurs, there will be no circuit between said terminal 48 and any of the terminals 36, 37, 38 or 39, because the arm 55 and the terminal 56 are free from engagement. Also, when the circuit breaker drum 25 is positioned to cause the insulating button 34 to separate its conductor clip 29 from said circuit breaker drum, the draft damper 11 is held approximately wide open.

As the enclosure or space continues its call for heat, the temperature at the furnace may rise to a greater or less extent above the sufficient and predetermined temperature which is effective in raising the temperature of the enclosure or space when forced thereinto. When this occurs, the contact element 79 becomes removed from the terminal 86 and engages the terminal 82, thus causing a circuit to be completed through the motor 22, and said motor advances the driven or actuating shaft 13 to cause the insulating button 33 to separate its conductor clip 28 from the circuit breaker drum 25. The motor circuit is traced from the lead in wire 47 to the terminal 48, thence by the lead wire 114, the terminal 113, the lead wire 112, the contact element 78, the terminal 85, the lead wire 100, the terminal 59, the lead wire 58, the room thermostat 20 and its arm 55, the terminal 56, the lead wire 63, the terminal 64, the lead wire 101, the contact element 80, the terminal 83, the lead wire 115, the contact element 79, the terminal 82, the lead wire 102, the terminal 103, the lead wire 105, the terminal 37, the lead wire 41, said conductor clip 28, the circuit breaker drum 25, the conductor clip 31 and the lead wires 49 and 50 to said motor 22, and from said motor to the lead in wire 46. When the insulating button 33 is engaged by the conductor clip 28, the draft damper 11 is closed and the conducting element 119 holds the blower or fan circuit closed, the contactors 120 and 121 spanning the conducting segments 117 and 118, and the contactor 121 being located at the upper portion of the arcuate segment 117. Should the temperature at the furnace fall below the temperature at which the contact element 79 will remain in engagement with the terminal 82, while the enclosure or space is still calling for heat, said contact element 79 will engage the terminal 86, and the driven or actuating shaft 13 will carry the insulating button 34 to position where it separates its conductor clip 29 from the circuit breaker drum 25, opening the draft damper 11 and holding the blower or fan circuit closed. Should the enclosure or space temperature become satisfied while the contact element 79 is in engagement with the terminal 82, the driven or actuating shaft will return to position as in Fig. 2 of the drawings.

In practice, the arrangement will be such that the contact element 79 will be caused to become removed from the terminal 86 and engage the terminal 82 at temperature somewhat above the temperature at which the contact element 80 becomes removed from the terminal 87 and engages the terminal 83. Thus, between the temperatures at which said contact element 80 engages the terminal 83 and said contact element 79 engages the terminal 82, the furnace will be set to give maximum heat and the warmed air forcing means will be operative, and at and above the temperature at which the contact element 79 engages the terminal 82, said furnace will be set to give minimum heat and said warmed air forcing means will be operative.

The switch of the multiple switch construction 21 constituted by the contact element 78 and the terminal 81 is a safety switch. The temperature at the furnace may rise above the temperature causing the contact element 79 to engage the terminal 82. In such an event, and at a predetermined high, or excessive, temperature, the contact element 78 will be caused to become removed from the terminal 85 and engage the terminal 81. This will close a circuit through the electric motor 22 including the conductor clip 28, and not including the room thermostat or either of its terminals. The motor circuit will be traced from the lead-in wire 47 to the terminal 48, thence by the lead wire 114, the terminal 113 and the lead wire 112 to the contact element 78, thence by the terminal 81, the lead wire 102, the terminal 103, the lead wire 105, the terminal 37, and the lead wire 41 to said conductor clip 28, and thence by the circuit breaker drum 25, the conductor clip 31, the lead wires 49 and 50 and the motor 22 to the lead-in wire 46. The driven or actuating shaft 13 will remain at position where the insulating button 33 separates the conductor clip 28 from the circuit breaker drum 25. In such position of said driven or actuating shaft 13, the furnace is set to give minimum heat and the warmed air forcing means is operative, as already set forth. After the contact element 78 and the terminal 81 comes into engagement, the furnace blower will remain operative and the furnace will supply minimum heat until said contact element 78 becomes removed from the terminal 81 and engages the terminal 85. Note that the contact element 79 is connected to the terminal 48 and that the terminal 85 is connected to the room thermostat 20 through the lead wire 100, the terminal 59 and the lead wire 58. It is evident then that when the contact element 78 engages the contact element 85, the room thermostat 20 is in the circuit of the electric motor 22 and, therefore, in control of said electric motor, but when the contact element 78 engages the terminal 81, the room thermostat 20 is out of the motor circuit. Or, stated in another way, whenever the temperature of the air at the heat producing device or furnace reaches a predetermined excessively high temperature, the contact element 78 opens the circuit to the room thermostat 20 and makes the connection to the terminal 37 causing the electric motor 22 to operate to the position of blower or fan motor 69 operative and draft damper 11 closed. This is necessary in order that the blower or fan motor 69 can always operate when the air in the heat producing device or furnace reaches a predetermined excessively high temperature even after the room temperature is satisfied.

Supposing that with the parts positioned as in Fig. 2, the enclosure or space calls for heat while the furnace is cold, the driven or actuating shaft 13 will rotate to position where the insulating button 35 separates its conductor clip 30 from the circuit breaker drum 25. Supposing then the furnace heats up so that the contact element 80 engages the terminal 83, or that the enclosure or space calls for heat while said contact element 80 and said terminal 83 are in engagement, the driven or actuating shaft 13 will situate the insulating button 34 in position separating the conductor clip 29 from said circuit breaker drum.

Supposing that the furnace heats up still further to cause the contact element 79 to engage the terminal 82, the driven or actuating shaft 13 will situate the insulating button 33 in position separating the conductor clip 28 from the circuit breaker drum. And supposing that the furnace heats up unduly until the contact element 78 engages the terminal 81, the driven or actuating shaft will remain at position where the insulating button 33 separates the conductor clip 28 from said circuit breaker drum, and the room thermostat 20 and its terminals will be cut out of the circuit of the motor 22. Upon return of the contact elements 78, 19 and 80, respectively, to their terminals 85, 86 and 87, respectively, each relative condition of the room thermostat and the furnace multiple switch construction will determine the stationary position of the driven or actuating shaft 13, as will be clear from the full description given. In any case, except when the contact element 78 and the terminal 81 are in engagement, the engagement of the arm 55 of the room thermostat with the terminal 57 will cause the regulator motor to be situated as in Fig. 2.

For each insulating button 32, 33, 34 and 35, there is a corresponding slot 54 in the gear 24.

Manipulating elements suitable to a particular purpose can be substituted for the crank arm 15, it being apparent that different types of devices, such as valves, automatic stokers, etc., to be remotely controlled and requiring motive power to effect their operation, may have to be associated with the driven or actuating shaft, such as 13, of a regulator motor in a manner entirely different from that of associating the draft damper 11 with the driven or actuating shaft 13 as illustrated and described.

It will be evident that the present heat producing device or furnace will function to care for each and all of the heating problems which various situations may present. The heat regulating means will be operative to supply a minimum amount of heat and the warmed air forcing means will be idle or inoperative when the enclosure or space is at the desired temperature and the furnace is not at an excessively high temperature.

The heat regulating means will be operative to supply an increased amount of heat and the warmed air forcing means will be inoperative whenever the enclosure or space falls below the desired temperature and the air at the heat producing device or furnace is at insufficient temperature to be effective in raising the temperature of said enclosure or space when forced thereinto.

The heat regulating means will be operative to supply an increased amount of heat and the warmed air forcing means will be operative whenever the enclosure or space falls below the desired temperature and the air at the heat producing device of furnace is at sufficient and predetermined temperature to be effective in raising the temperature of said enclosure or space when forced thereinto by said warmed air forcing means.

As the enclosure or space continues its call for heat, the heat regulating means remains operative to supply an increased amount of heat and the warmed air forcing means remains operative so long as (1) the temperature of the air at the heat producing device or furnace does not fall below the before mentioned sufficient and predetermined temperature to be effective in raising the temperature of said enclosure or space when forced thereinto by said warmed air forcing means, or (2) the temperature of the air at said heat producing device or furnace does not rise greatly above said sufficient and predetermined temperature. When the temperature of the air at the heat producing device or furnace falls below said sufficient and predetermined temperature, to thus become ineffective to raise the temperature of the enclosure or space when forced thereinto by the warmed air forcing means, the heat regulating means remains operative to supply an increased amount of heat and the warmed air forcing means becomes inoperative. When the temperature of the air at the heat producing device or furnace rises above said sufficient and predetermined temperature to a higher predetermined temperature, while the enclosure or space is continuing its call for heat, the heat regulating means becomes operative to supply a minimum amount of heat and the warmed air forcing means remains operative to force warmed air into the enclosure or space. In an instance when the warmed air forcing means removes sufficient warmed air from the furnace to cause the temperature of the air at the heat producing device or furnace to fall below the before mentioned sufficient and predetermined temperature so that the heat regulating means remains operative to supply an increased amount of heat and the warmed air forcing means becomes inoperative, while the enclosure or space is calling for heat, said heat producing device or furnace, naturally, gets warmer, and upon the subsequent raising of the temperature of the air at the heat producing device or furnace to said sufficient and predetermined temperature, said heat regulating means still remains operative to supply an increased amount of heat and said warmed air forcing means again becomes operative. In an instance when the temperature of the air at the heat producing device or furnace rises above said sufficient and predetermined temperature to a higher predetermined temperature to cause the heat regulating means to become operative to supply a minimum amount of heat and the warmed air forcing means to remain operative to force warmed air into the enclosure or space, while the enclosure or space is calling for heat, upon the falling of the temperature of the air at the heat producing device or furnace from said mentioned higher predetermined temperature to said mentioned predetermined and sufficient temperature, said heat regulating means again becomes operative to supply an increased amount of heat and said warmed air forcing means remains operative.

When the enclosure or space reaches the desired temperature while the heat producing device or furnace is operative to supply an increased amount of heat and the warmed air forcing means is inoperative, said heat regulating means will become operative to supply a minimum amount of heat and said warmed air forcing means will remain inoperative.

When the enclosure or space reaches the desired temperature while the heat producing device or furnace is operative to supply an increased amount of heat and the warmed air forcing means is operative, said heat regulating means will become operative to supply a minimum amount of heat and said warmed air forcing means will become inoperative.

When the enclosure or space reaches the desired temperature while the heat producing device or furnace is operative to supply a minimum amount of heat and the warmed air forcing means is operative, due to the temperature of the air at the heat producing device or furnace having risen from the before mentioned sufficient and predetermined temperature to the before mentioned higher predetermined temperature, said heat regulating means will remain operative to supply a minimum amount of heat and said warmed air forcing means will become inoperative.

When the temperature of the air at the heat producing device or furnace rises to an excessively high temperature, the heat regulating means is operative to supply a minimum amount of heat and the warmed air forcing means is operative. So long as the heat producing device or furnace is at or above a predetermined high temperature, the heat regulating means is operative to supply a minimum amount of heat and the warmed air forcing means is operative whether or not the temperature at the enclosure or space is satisfied. When the temperature of the air at the heat producing device or furnace falls below the predetermined, excessively high temperature while the enclosure or space is still calling for heat, the heat regulating means remains operative to supply a minimum amount of heat and the warm air forcing means remains operative to blow warmed air into the enclosure or space. When the temperature of the air at the heat producing device or furnace falls below said predetermined, excessively high temperature while the enclosure or space is satisfied, the heat regulating means remains operative to supply a minimum amount of heat and the warmed air forcing means becomes inoperative. In any instance when the heating device or furnace contains air at or above some predeterminedly high, or excessively high, temperature, the highly heated air is forced into the enclosure or space even after said enclosure or space is satisfied, and until the temperature of the air at the heating device or furnace falls below the predetermined, excessively high temperature.

The present heat producing device or furnace functions in ideal manner, considered from the standpoint of fuel economy as well as from the standpoint of desired heating results. The control of said heat producing device or furnace is accomplished in a manner tending to properly balance the conditions which prevail, and at the same time utilize the whole of the heat energy supplied. The arrangement at the heat producing device or furnace is such that the warmed air forcing means and the heat regulating means cooperate with each other toward maintaining said heat producing device or furnace between moderate, not too high and not too low, temperature limits, which limits will, of course, predeterminedly be those designed to accomplish the maximum in heating efficiency. The whole arrangement functions to prevent overruns of the heat producing device or furnace which ordinarily occur after a heated enclosure or space has reached desired temperature, as well as to attain the maximum in temperature balance at said enclosure or space.

The present electrically operated mechanism includes but a single room thermostat composed of a single bimetallic strip or blade and employing but two contact elements, one engaged by the bimetallic strip or blade when the enclosure or space calls for heat, and the other engaged by said bimetallic strip or blade when the enclosure or space reaches desired temperature. The regulator motor, and consequently the heat regulating means and the warmed air forcing means, are all thus responsive in their operations to a single thermostatic device situated in the enclosure or space to be heated and including only two simple switches, as modified by the conditions of the furnace thermostat. Evidently, the operations of said heat regulating means and said warmed air forcing means are of necessity in accord and synchronism. When more than a single room thermostat is employed for the control of a heat producing device or furnace of the present general nature, as, for example, one thermostat to control the heat regulating means, and another thermostat to control the warmed air forcing means, there is always probability that there may not be accord and synchronism in the operations of said heat regulating means and said warmed air forcing means.

In summer, the switch 98 may be associated with the terminal 104, so that when the enclosure or space becomes warm and the arm 55 of the room thermostat 20 engages the terminal 57, the air blower will be operative to force air into the enclosure or space for cooling purposes. As soon as the temperature of the air in the enclosure or space drops below the setting of the room thermostat the blower ceases to operate. The remainder of the mechanism will be inoperative in summer as will be understood.

What is claimed is:

1. In an electrically operated mechanism for the remote control of a heat producing device including heat regulating means and means for forcibly circulating fluid medium warmed by said heat producing device to warm a space to be heated, mechanism for controlling said heat regulating means and said warmed fluid medium circulating means and capable of actuating each of said means to any predetermined one of a plurality of different conditions, a plurality of thermostatically actuated instruments each adapted to make a circuit including said instruments and a part of said mechanism for separately starting operations of said mechanism, and means operative when each of said heat regulating means and said warmed fluid medium circulating means is in any one of said plurality of different conditions as predetermined by said thermostatically actuated instruments for discontinuing operation of said mechanism.

2. In an electrically operated mechanism for the remote control of a heat producing device including heat regulating means and means for forcibly circulating fluid medium warmed by said heat producing device into a space to be heated, a motor for controlling said heat regulating means and said warmed fluid medium circulating means and capable of actuating each of said means to any predetermined one of a plurality of different conditions, a plurality of thermostatically actuated instruments including a thermostatic blade responsive to temperature changes at said space and a multiple switch construction responsive to temperature changes at said heat producing device for separately starting operations of said motor, and means operative when each of said heat regulating means and said warmed fluid medium circulating means is in any one of said plurality of different conditions as predetermined by said thermostatically actuated instruments for discontinuing operation of said motor.

3. In an electrically operated mechanism for the remote control of a heat producing device including heat regulating means and means for forcibly circulating fluid medium warmed by said heat producing device, mechanism for controlling said heat regulating means and said warmed fluid medium circulating means and capable of actuating each of said means to any predetermined one of a plurality of different conditions, a plurality of thermostatically actuated instruments including an instrument responsive to temperature changes of the circulated medium and a multiple switch construction responsive to temperature changes at said heat producing device for starting operations of said mechanism, and means operative when each of said heat regulating means and said warmed fluid medium circulating means is in any one of said plurality of different conditions as predetermined by said thermostatically actuated instruments for discontinuing operation of said mechanism.

4. In an electrically operated mechanism for the remote control of a heat producing device including heat regulating means and means for forcibly circulating fluid medium warmed by said heat producing device to warm a space to be heated, mechanism for controlling said heat regulating means and said warmed fluid medium circulating means and capable of actuating each of said means to any predetermined one of a plurality of different conditions, a thermostatically actuated instrument responsive to temperature changes at said space and a thermostatically actuated multiple switch construction responsive to temperature changes at said heat producing device for separately starting operations of said mechanism, said multiple switch construction including a plurality of normally closed electric switches adapted to be progressively opened in response to rise of temperature at said heat producing device and to be progressively closed in response to fall of temperature at the heat producing device and also including a plurality of normally open electric switches adapted to be progressively closed upon rise of temperature at said heat producing device and progressively opened upon fall of temperature at the heat producing device, and means operative when each of said heat regulating means and said warmed fluid medium circulating means is in any one of a plurality of different conditions as predetermined by said thermostatically actuated instrument and said multiple switch construction for discontinuing operation of said mechanism.

5. In an electrically actuated mechanism for the remote control of a heat producing device including heat regulating means and means for forcibly circulating fluid medium warmed by said heat producing device to warm a space to be heated, mechanism for controlling said heat regulating means and said warmed fluid medium circulating means and capable of actuating each of said means to any predetermined one of a plurality of different conditions, a thermostatically actuated instrument responsive to temperature changes at said space and a thermostatically actuated multiple switch construction responsive to temperature changes at said heat producing device for separately starting operations of said mechanism, said multiple switch construction including a normally closed electric switch adapted to be open when the temperature at said heat producing device is at or above a predetermined high temperature, an electric switch adapted to be open when said normally closed switch is closed and to be closed when said normally closed electric switch is open, a second normally closed electric switch adapted to be open when the temperature at said heat producing device is at or above a predetermined temperature somewhat higher than said predetermined high temperature, a second electric switch adapted to be open when said second normally closed switch is closed and to be closed when said second normally closed switch is open, a third normally closed electric switch adapted to be open when the temperature at said heat producing device is at or above a predetermined excessively high temperature somewhat higher than the temperature causing said second normally closed electric switch to open and said second electric switch to close, and a safety electric switch adapted to be open when said third normally closed electric switch is closed and to be open when said third normally closed electric switch is open, said safety electric switch when closed making a circuit for starting operation of said mechanism which circuit excludes the thermostatically actuated instrument responsive to temperature changes at said space, and each of the other electric switches, respectively, of said multiple switch construction being included in circuits which also include said thermostatically actuated instrument, and means operative when each of said heat regulating means and said warmed fluid medium circulating means is in any one of a plurality of different conditions as predetermined by said thermostatically actuated instrument and said multiple switch construction for discontinuing operation of said mechanism.

6. In a mechanism of the character described including a heat producing device, a multiple switch construction comprising a plurality of separate resilient contact elements each insulated from the other, a terminal at one side of each of said resilient contact elements normally engaged thereby, a terminal at the opposite side of each of said resilient contact elements normally spaced therefrom, means responsive to temperature changes at said heat producing device, and separate entities actuated by said means in response to rise of temperature at said heat producing device for progressively moving first one and then another of said resilient contact elements out of engagement with its normally engaged terminal and into engagement with its other terminal, said separate entities being actuated in response to fall of temperature at said heat producing device to, in reverse order, allow first one and then another of said resilient contact elements progressively to become removed from its terminal from which normally spaced and engage its normally engaged terminal.

7. In a mechanism of the character described including a heat producing device, a multiple switch construction comprising an electric switch adapted to be closed when the temperature at said heat producing device is below a predetermined high temperature and to be open when the temperature at said heat producing device is at or above said predetermined high temperature, a second electric switch adapted to be open when said first mentioned electric switch is closed and to be closed when the first mentioned electric switch is open, a third electric switch adapted to be closed when the temperature at said heat producing device is below a predetermined temperature somewhat higher than said predetermined high temperature and to be open when the temperature at said heat producing device is at or above said predetermined temperature somewhat higher than said predetermined high temperature, a fourth electric switch adapted to be open when said third electric switch is closed and to be closed when said third electric switch is open, a fifth electric switch adapted to be closed when the temperature at said heat producing device is below a predetermined excessively high temperature somewhat higher than the temperature causing said third electric switch to open and said fourth electric switch to close and to be open when the temperature at said heat producing device is at or above said predetermined excessively high temperature, and a safety electric switch adapted to be open when said fifth electric switch is closed and to be closed when said fifth electric switch is open, each of said electric switches being insulated from all of the others of the electric switches.

EVERETT H. WHITE.
LESLIE E. TURNER.